United States Patent
Yang et al.

(10) Patent No.: US 10,204,402 B2
(45) Date of Patent: Feb. 12, 2019

(54) DRONE-MOUNTED IMAGING HYPERSPECTRAL GEOMETRIC CORRECTION METHOD AND SYSTEM

(71) Applicant: BEIJING RESEARCH CENTER FOR INFORMATION TECHNOLOGY IN AGRICULTURE, Beijing (CN)

(72) Inventors: Guijun Yang, Beijing (CN); Chunjiang Zhao, Beijing (CN); Haiyang Yu, Beijing (CN); Xiaodong Yang, Beijing (CN); Xingang Xu, Beijing (CN); Xiaohe Gu, Beijing (CN); Haikuan Feng, Beijing (CN); Hao Yang, Beijing (CN); Hua Yan, Beijing (CN)

(73) Assignee: BEIJING RESEARCH CENTER FOR INFORMATION TECHNOLOGY IN AGRICULTURE, Beijing (CN)

( * ) Notice: Subject to any disclaimer, the term of this patent is extended or adjusted under 35 U.S.C. 154(b) by 313 days.

(21) Appl. No.: 15/314,681

(22) PCT Filed: Jan. 23, 2014

(86) PCT No.: PCT/CN2014/071250
§ 371 (c)(1),
(2) Date: Nov. 29, 2016

(87) PCT Pub. No.: WO2015/106462
PCT Pub. Date: Jul. 23, 2015

(65) Prior Publication Data
US 2017/0200259 A1    Jul. 13, 2017

(30) Foreign Application Priority Data

Jan. 15, 2014    (CN) .......................... 2014 1 0017463

(51) Int. Cl.
*G06T 5/00*        (2006.01)
*H04N 5/217*       (2011.01)
(Continued)

(52) U.S. Cl.
CPC ................ *G06T 5/006* (2013.01); *G06T 7/50* (2017.01); *H04N 5/217* (2013.01); *H04N 5/23222* (2013.01); *G06T 2207/10036* (2013.01)

(58) Field of Classification Search
CPC . G06T 5/006; G06T 7/50; G06T 2207/10036; H04N 5/217; H04N 5/23222
See application file for complete search history.

(56) References Cited

U.S. PATENT DOCUMENTS

| 4,679,753 A | 7/1987 | Landecker |
| 2005/0031197 A1* | 2/2005 | Knopp ................... G01C 11/06 382/154 |

FOREIGN PATENT DOCUMENTS

| CN | 101900550 | 12/2010 |
| CN | 102243299 | 11/2011 |

(Continued)

OTHER PUBLICATIONS

Cloutis, "Review Article: Hyperspectral geological remots sensing: evaluation of analytical techniques", International Journal of Remote Sensing, Aug. 1996, 29 pages.
(Continued)

*Primary Examiner* — Christopher Braniff
(74) *Attorney, Agent, or Firm* — Dorsey & Whitney LLP

(57) ABSTRACT

Related are a drone-mounted imaging hyperspectral geometric correction method and a system, comprising: collecting position attitude information of a current drone low-precision POS sensor in real time; based on the position attitude information, parsing precise photography center
(Continued)

position attitude information of a digital photograph, and generating a DEM of an area covered by the photograph; based on the precise photography center position attitude information, performing correction on position attitude data corresponding to multiple imaging hyperspectral scan lines between photography centers of adjacent digital photographs, and obtaining high-precision linear array position attitude information of the multiple imaging hyperspectral scan lines; based on the high-precision linear array position attitude information and the DEM, establishing a collinearity equation and generating a hyperspectral image.

9 Claims, 2 Drawing Sheets

(51) Int. Cl.
*G06T 7/50* (2017.01)
*H04N 5/232* (2006.01)

(56) References Cited

FOREIGN PATENT DOCUMENTS

| CN | 102506824 | 6/2012 |
|---|---|---|
| CN | 102866393 | 1/2013 |

OTHER PUBLICATIONS

Li, "Discuss on Images Ortho-Rectification Technology Based on Terrain Database and Airbone POS", Geomatics World, No. 6, Dec. 2012, 58-61 pages.

Liao, "Geometric Precision Correction of Remote Sensing Image", Geospatial Information, vol. 6, No. 5, Oct. 2008, pp. 86-88.

International Search Report and Written Opinion received in PCT/CN2014/071250 dated Nov. 26, 2016, and English Translation.

\* cited by examiner

DRONE-MOUNTED IMAGING HYPERSPECTRAL GEOMETRIC CORRECTION METHOD AND SYSTEM

FIELD OF THE INVENTION

The present invention relates to the field of image processing technology, and particularly relates to a drone-mounted imaging hyperspectral geometric correction method and system.

BACKGROUND OF THE INVENTION

A POS (Position and Orientation System) sensor is used for acquiring position and attitude information.

A DEM (Digital Elevation Model) is a virtual representation of typography, and can be obtained by means of photogrammetry based on aerial or satellite images. As basic data for orthorectification of digital images, a DEM is a necessary condition for establishing a collinearity equation in photogrammetry.

In recent years, imaging hyper-spectrometer remote sensing technology, with the characteristics of images and spectrum integration, high spatial and spectral resolution and the like, has promoted agricultural remote sensing quantitative development, and has a great potential of applications. However, a satellite remote sensing platform is limited by an orbit, so its over-the-top time is fixed every day, and emergency observation cannot be implemented thereby; and acquisition of image data through piloted aerial remote sensing leads to a high cost and is greatly affected by weather conditions. With the development of drone technology, a novel remote sensing detection technology using a drone as a low-altitude flight platform with an earth observation sensor has developed rapidly, and especially micro-drones with the characteristics of good maneuvering flexibility, short operation period, timeliness, low maintenance cost, economy and practicality, etc. are very suitable for mounting minitype imaging hyperspectral equipment to achieve agricultural low-altitude remote sensing observation, and has important research and application value.

A loaded platform of a drone is low in stability and greatly influenced by the airflow speed, and most imaging hyper-spectrometers adopt a linear array sensor push-broom imaging mode, and the linear array spectral position and attitude change all the time during imaging, causing obvious geometric distortion of imaging spectral data. During push-broom imaging of an imaging spectrometer, tens to hundreds of linear array spectral lines are collected per second, and high-precision sensor position and attitude information is required for data geometric correction thereafter. However, due to a relatively small load of a drone, a conventional large high-precision POS system cannot be mounted thereto, the high-precision sensor position and attitude information cannot be collected synchronously during the push-broom imaging, and only low-precision POS data of a sensor mounted simply to the drone is obtained. As a result, geometric distortion of drone-mounted imaging hyperspectral images is difficult to restore, and geometric precise correction has become a bottleneck problem obstructing drone imaging hyperspectral wide application.

SUMMARY OF THE INVENTION

(I) Technical Problems to be Solved

Technical problems to be solved by the present invention are as follows: A platform of a drone is low in stability and greatly influenced by the airflow speed, and most drone-mounted imaging hyper-spectrometers adopt a linear array sensor push-broom imaging mode, with obvious linear array position and attitude changes during imaging, causing relatively serious geometric distortion of spectral images; the coverage of a single linear array of the drone-mounted imaging hyper-spectrometer is small, with great difficulty of feature extraction, a low overlap degree between linear arrays, and great difficulty of feature matching between adjacent linear arrays, a DEM of a region under detection cannot be extracted effectively; moreover, a drone has a low load capacity, and a high-precision POS system usually cannot be mounted thereon to acquire high-precision imaging hyperspectral linear array position attitude information. In view of the above conditions, drone-mounted imaging hyperspectral geometric correction is dealt with herein.

(II) Technical Solution

To this end, the present invention provides a drone-mounted imaging hyperspectral geometric correction method, including the following steps:

collecting position attitude information of a current drone low-precision POS sensor in real time;

based on the position attitude information, parsing precise photography center position attitude information of a digital photograph, and generating a DEM of an area covered by the photograph;

based on the precise photography center position attitude information, performing correction on position attitude data corresponding to multiple imaging hyperspectral scan lines between photography centers of adjacent digital photographs, and obtaining high-precision linear array position attitude information of the multiple imaging hyperspectral scan lines; and based on the high-precision linear array position attitude information and the DEM, establishing a collinearity equation and generating a hyperspectral image, thus achieving drone-mounted imaging hyperspectral geometric correction.

Preferably, before collecting position attitude information of a current drone low-precision POS sensor in real time, the method further includes:

arranging a digital camera, the imaging hyper-spectrometer and the drone low-precision POS sensor at adjacent positions in a same plane so that position attitude information of the three types of sensors is consistent;

setting a collecting frequency $V_{DC}$ of the digital camera; and setting a sampling frequency $V_{HIS}$ of the imaging hyper-spectrometer based on the collecting frequency $V_{DC}$ of the digital camera.

Preferably, setting a collecting frequency $V_{DC}$ of the digital camera is specifically:

setting a collecting frequency $V_{DC}$ of the digital camera based on a drone flight height and flight speed and an observation field of view angle $FOV_{DC}$ of the digital camera;

$$V_{DC} = \frac{S}{2 * H * tg(FOV_{DC}/2) * (1-r)}$$

wherein S represents the drone flight speed, represents the drone flight height, $FOV_{DC}$ represents the field of view angle of the digital camera, and r represents a photograph overlap degree required for space triangulation.

Preferably, setting a sampling frequency $V_{HIS}$ of the imaging hyper-spectrometer based on the collecting frequency $V_{DC}$ of the digital camera is specifically:

$$V_{HIS} = \frac{S}{V_{DC} * 2 * H * tg(IFOV_{HIS}/2)}$$

wherein S represents the drone flight speed, represents the drone flight height, and $IFOV_{HIS}$ represents a field of view angle corresponding to a single detector on an imaging spectrometer linear array.

Preferably, based on the position attitude information, parsing precise photography center position attitude information of a digital photograph is specifically:

based on the position attitude information of the current drone low-precision POS sensor collected in real time and a digital photograph, parsing precise photography center position attitude information of the digital photograph using a space triangulation method.

Preferably, based on the precise photography center position attitude information, performing correction on position attitude data corresponding to multiple imaging hyperspectral scan lines between photography centers of adjacent digital photographs specifically includes:

performing time matching between the position attitude information of the current drone low-precision POS sensor collected in real time and multiple imaging hyperspectral scan lines between photography centers of adjacent digital photographs, and obtaining position attitude data corresponding to the imaging hyperspectral scan lines;

based on the precise photography center position attitude information, performing correction on the position attitude data corresponding to the multiple imaging hyperspectral scan lines.

The present invention further provides a drone-mounted imaging hyperspectral geometric correction system, including:

a collection module, a parsing module, a correction module and generation module, wherein the collection module is used for collecting position attitude information of a current drone low-precision POS sensor in real time;

the parsing module is used for based on the position attitude information collected by the acquisition module, parsing precise photography center position attitude information of a digital photograph, and based on the center position attitude information, generating a DEM of an area covered by the photograph; and the correction module is used for based on the photography center position attitude information, performing correction on position attitude data corresponding to multiple imaging hyperspectral scan lines between photography centers of adjacent digital photographs, and obtaining linear array position attitude information of the multiple imaging hyperspectral scan lines; and the generation module is used for based on the linear array position attitude information and the DEM, establishing a collinearity equation and generating a hyperspectral image.

Preferably, the system further includes a setting module;

the setting module is used for arranging a digital camera, the imaging hyper-spectrometer and the drone low-precision POS sensor at adjacent positions in a same plane so that position attitude information of the three types of sensors is consistent; and the setting module is further used for setting a collecting frequency of the digital camera and setting a sampling frequency of the imaging hyper-spectrometer based on the collecting frequency of the digital camera.

Preferably, the correction module includes a matching unit and a correction unit;

the matching unit is used for performing time matching between the position attitude information of the current drone low-precision POS sensor collected in real time and the multiple imaging hyperspectral scan lines between the photography centers of the adjacent digital photographs, and obtaining position attitude data corresponding to the imaging hyperspectral scan lines;

the correction unit is used for based on the precise photography center position attitude information, performing correction on the position attitude data corresponding to the imaging hyperspectral scan lines.

(III) Beneficial Effects

By adopting the drone-mounted imaging hyperspectral geometric correction method and system disclosed by the present invention, the high-precision POS information calculated from drone area array digital imaging data is used to perform optimization on the drone low-precision POS data, geometric precise correction of the imaging hyper-spectrometer for the scan lines one by one is implemented, thus providing technical support for drone imaging hyperspectral wide application.

BRIEF DESCRIPTION OF THE DRAWINGS

Features and advantages of the present invention will be understood more clearly with reference to the accompanying drawings, which are illustrative and should not be understood as limiting the present invention. In the drawings.

DETAILED DESCRIPTION OF THE EMBODIMENTS

The embodiments of the present invention will be described in detail below in conjunction with the accompanying drawings.

The present invention provides a drone-mounted imaging hyperspectral geometric correction method and system, whereby in consideration of characteristics of a drone remote sensing platform and imaging characteristics of an imaging hyper-spectrometer, a high-resolution area array imaging digital camera (DC) and a linear array push-broom imaging hyper-spectrometer (HIS, Hyperspectral Imaging System) are integrated, and digital photographs, a ground control point, and a low-precision POS (Position and Orientation System) sensor carried on a drone are used to synchronously collect position and attitude information, and an aerial triangulation method is adopted to work out high-precision POS information of photography centers of digital photographs and a DEM of a region under detection. Polynomial fitting is performed on POS data corresponding to scan lines of the imaging hyper-spectrometer between the photography centers of adjacent digital photographs. Then the obtained high-precision POS information of the photography centers of digital photographs is substituted into a polynomial equation to obtain high-precision POS information for the scan lines one by one. Finally, in combination with the DEM and the high-precision POS information for the scan lines one by one, a collinearity equation is established to implement geometric correction on drone-mounted imaging hyperspectral data.

Figure 1:
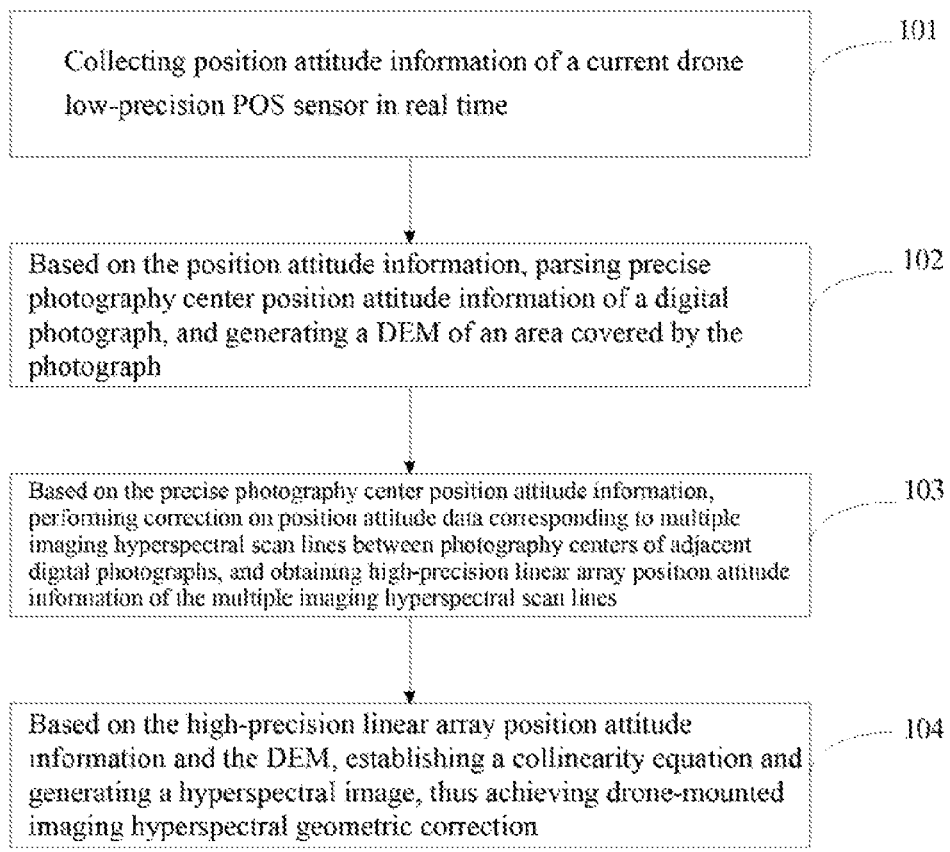
FIG. 1 is a flow diagram of a drone-mounted imaging hyperspectral geometric correction method in the present invention.

Embodiment I of the present invention provides a drone-mounted imaging hyperspectral geometric correction method, as shown in FIG. 1, including the following steps:

step 101, collecting position attitude information of a current drone low-precision POS sensor in real time;

step 102, based on the position attitude information, parsing precise photography center position attitude information of a digital photograph, and generating a DEM of an area covered by the photograph;

step 103, based on the precise photography center position attitude information, performing correction on position attitude data corresponding to multiple imaging hyperspectral scan lines between photography centers of adjacent digital photographs, and obtaining high-precision linear array position attitude information of the multiple imaging hyperspectral scan lines; and step 104, based on the high-precision linear array position attitude information and the DEM, establishing a collinearity equation and generating a hyperspectral image, thus achieving drone-mounted imaging hyperspectral geometric correction.

Preferably, before collecting position attitude information of a current drone low-precision POS sensor in real time, the method further includes:

arranging a digital camera, the imaging hyper-spectrometer and the drone low-precision POS sensor at adjacent positions in a same plane so that position attitude information of the three types of sensors is consistent;

setting a collecting frequency $V_{DC}$ of the digital camera; and setting a sampling frequency $V_{HIS}$ of the imaging hyper-spectrometer based on the collecting frequency $V_{DC}$ of the digital camera.

Preferably, setting a collecting frequency $V_{DC}$ of the digital camera is specifically:

setting a collecting frequency $V_{DC}$ of the digital camera based on a drone flight height and flight speed and an observation field of view angle $FOV_{DC}$ of the digital camera;

$$V_{DC} = \frac{S}{2*H*tg(FOV_{DC}/2)*(1-r)}$$

wherein S represents the drone flight speed, H represents the drone flight height, $FOV_{DC}$ represents the field of view angle of the digital camera, and r represents a photograph overlap degree required for space triangulation.

Preferably, setting a sampling frequency $V_{HIS}$ of the imaging hyper-spectrometer based on the collecting frequency $V_{DC}$ of the digital camera is specifically:

$$V_{HIS} = \frac{S}{V_{DC}*2*H*tg(IFOV_{HIS}/2)}$$

wherein S represents the drone flight speed, H represents the drone flight height, and $IFOV_{HIS}$ represents a field of view angle corresponding to a single detector on an imaging spectrometer linear array.

Preferably, based on the position attitude information, parsing precise photography center position attitude information of a digital photograph is specifically:

based on the position attitude information of the current drone low-precision POS sensor collected in real time and a digital photograph, parsing precise photography center position attitude information of the digital photograph using a space triangulation method.

The embodiment integrates a Canon 5D Mark II digital camera (DC) and an independently developed imaging hyper-spectrometer (HIS). The sampling frequency of the drone POS system can reach 100 Hz, the positioning is measured by a GPS receiver, and the attitude is measured by an IMU sensor, wherein the precision of a roll ($\Psi$), a pitch ($\omega$) and a yaw (K) measured by the IMU sensor is ±1.0°, and the plane (X/Y) precision of the GPS receiver is 2/2.5 m, and the elevation (Z) precision thereof is 5 m. The imaging hyper-spectrometer has 200 imaging wavebands. The above-mentioned three types of sensors are disposed in a same plane at adjacent positions, and consistency of the measured position attitude information of the POS sensor and that of the other sensors is ensured.

To meet the requirement of subsequent space triangulation, the collecting frequency $V_{DC}$ (Hz) of the digital camera is calculated based on the drone flight height and flight speed and the observation field of view angle ($FOV_{DC}$) of the digital camera; and on this basis, the sampling frequency $V_{HIS}$ (Hz) of the imaging spectrometer is determined based on a sampling frequency of the digital camera and an instantaneous field of view angle (IFOV) of the imaging spectrometer.

$$V_{DC} = \frac{S}{2*H*tg(FOV_{DC}/2)*(1-r)} \quad (1)$$

S represents the drone flight speed (m/s), H represents the drone flight height (m), $FOV_{DC}$ represents the field of view angle (radian) of the digital camera, and r represents a photograph overlap degree (%) required for space triangulation.

$$V_{HIS} = \frac{S}{V_{DC}*2*H*tg(IFOV_{HIS}/2)} \quad (2)$$

wherein $IFOV_{HIS}$ represents a field of view angle (radian) corresponding to a single detector on an imaging spectrometer linear array.

Using the drone flight speed of 15 m/s and the drone flight height of 300 m as an example, $V_{HIS}$ is at least 200 times $V_{DC}$. That is, $V_{HIS}$ is much greater than $V_{DC}$. Therefore, linear array push-broom is carried out multiple times by the imaging hyper-spectrometer during adjacent two imaging processes of the digital camera.

The drone POS sensor carries out continuous data measurement at maximal 100 Hz and stores POS data.

Based on the photography overlap degree of the digital camera, a same point on the ground can be imaged in multiple photographs, and a traditional photogranimetry and aerial triangulation method can be adopted to precisely solve precise POS information ($POS_{S1}$, $POS_{S2}$ ... $POS_{Sn}$) of photography position of the photographs, and on this basis, to generate a DEM of an area covered by the photographs.

Preferably, based on the precise photography center position attitude information, performing correction on position attitude data corresponding to multiple imaging hyperspectral scan lines between photography centers of adjacent digital photographs specifically includes:

performing time matching between the position attitude information of the current drone low-precision POS sensor collected in real time and multiple imaging hyperspectral scan lines between photography centers of adjacent digital photographs, and obtaining position attitude data corresponding to the imaging hyperspectral scan lines; and based on the precise photography center position attitude information, performing correction on the position attitude data corresponding to the multiple imaging hyperspectral scan lines.

In this embodiment, based on the precise photography center position attitude information, performing correction on the position attitude data corresponding to the multiple imaging hyperspectral scan lines is specifically:

performing polynomial fitting on the position attitude data corresponding to the scan lines of the imaging hyperspectrometer between the photography centers of the adjacent digital photographs, and substituting the precise photography center position attitude information into a polynomial equation to obtain high-precision POS information for the scan lines one by one.

Figure 2:
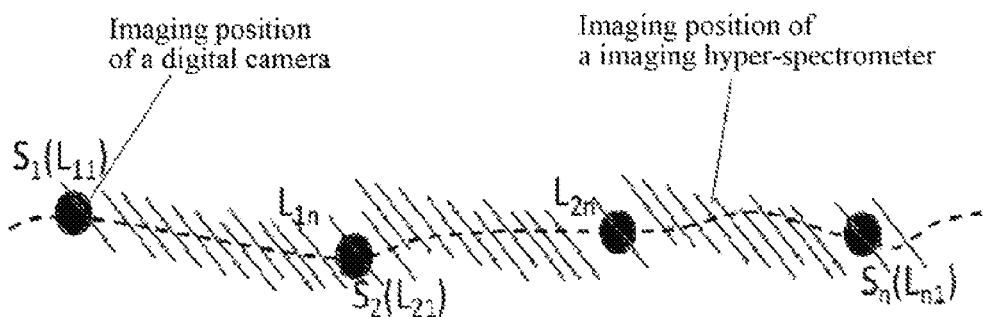
FIG. 2 is a schematic diagram of imaging position information of a digital camera and an imaging hyper-spectrometer in an embodiment of the present invention.

In this embodiment, correction on the imaging hyperspectral POS data for the scan lines one by one is as follows: as shown in FIG. 2, using S1 and S2 as an example, polynomial fitting is performed on the POS data, during an imaging time interval between S1 and S2 of the digital camera, i.e. corresponding to L11-L1$n$ for scanning, totally n scan lines, of the imaging hyper-spectrometer. With S1 as a reference point in the fitting, POS component values ($X_{S1}$, $Y_{S1}$, $Z_{S1}$, $\Psi_{S1}$, $\omega_{S1}$, $K_{S1}$) at the imaging moment S1 are subtracted from POS position and attitude components (Xt, Yt, Zt; $\Psi$t, $\omega$t, Kt) measured at moments (t=t1, t2, ... tn) respectively according to formula (3), to obtain variations of the POS components at the moments relative to S1:

$$\begin{bmatrix} \Delta X_t^{S1} \\ \Delta Y_t^{S1} \\ \Delta Z_t^{S1} \end{bmatrix} = \begin{bmatrix} Xt \\ Yt \\ Zt \end{bmatrix} - \begin{bmatrix} X_{S1} \\ Y_{S1} \\ Z_{S1} \end{bmatrix} \quad (3)$$

$$\begin{bmatrix} \Delta \varphi_t^{S1} \\ \Delta \omega_t^{S1} \\ \Delta \kappa_t^{S1} \end{bmatrix} = \begin{bmatrix} \varphi t \\ \omega t \\ \kappa t \end{bmatrix} - \begin{bmatrix} \varphi_{S1} \\ \omega_{S1} \\ \kappa_{S1} \end{bmatrix}$$

then the calculated variations ($\Delta X_t^{S1}$, $\Delta Y_t^{S1}$, $\Delta Z_t^{S1}$; $\Delta \Psi_t^{S1}$, $\Delta \omega_t^{S1}$, $\Delta K_t^{S1}$) are fitted by using a polynomial method:

$$\begin{bmatrix} \Delta X_t^{S1} \\ \Delta Y_t^{S1} \\ \Delta Z_t^{S1} \end{bmatrix} = \begin{bmatrix} x_0 + x_1 t + x_2 t^2 \\ y_0 + y_1 t + y_2 t^2 \\ z_0 + z_1 t + z_2 t^2 \end{bmatrix} = \begin{bmatrix} x_0 & x_1 & x_2 \\ y_0 & y_1 & y_2 \\ z_0 & z_1 & z_2 \end{bmatrix} \begin{bmatrix} 1 \\ t \\ t^2 \end{bmatrix} = G_{xyz} * T \quad (4)$$

$$\begin{bmatrix} \Delta \varphi_t^{S1} \\ \Delta \omega_t^{S1} \\ \Delta \kappa_t^{S1} \end{bmatrix} = \begin{bmatrix} \varphi_0 + \varphi_1 t + \varphi_2 t^2 \\ \omega_0 + \omega_1 t + \omega_2 t^2 \\ \kappa_0 + \kappa_1 t + \kappa_2 t^2 \end{bmatrix} = \begin{bmatrix} \varphi_0 & \varphi_1 & \varphi_2 \\ \omega_0 & \omega_1 & \omega_2 \\ \kappa_0 & \kappa_1 & \kappa_2 \end{bmatrix} \begin{bmatrix} 1 \\ t \\ t^2 \end{bmatrix} = O_{xyz} * T;$$

wherein t=(t1, t2 ... tn);

$$G_{xyz} = \begin{bmatrix} x_0 & x_1 & x_2 \\ y_0 & y_1 & y_2 \\ z_0 & z_1 & z_2 \end{bmatrix}$$

represents polynomial fitting equation coefficients of POS measurement (X, Y, Z) coordinates of the imaging hyper-spectrometer for the scan lines during the imaging time interval between S1 and S2;

$$O_{xyz} = \begin{bmatrix} \varphi_0 & \varphi_1 & \varphi_2 \\ \omega_0 & \omega_1 & \omega_2 \\ \kappa_0 & \kappa_1 & \kappa_2 \end{bmatrix}.$$

represents polynomial fitting equation coefficients of POS measurement ($\Psi$, $\omega$, K) attitudes of the imaging hyper-spectrometer for the scan lines during the imaging time interval between S1 and S2; and $$T = \begin{bmatrix} 1 \\ t \\ t^2 \end{bmatrix};$$

represents a time weight matrix for the scan lines.

Finally, S1 high-precision POS information calculated with the photographs taken by the digital camera, i.e. the components corresponding to $POS_{S1}$ are input to the above fitted polynomial equation respectively, to calculate high-precision POS information, i.e. linear array position attitude information, corresponding to the scan lines of the imaging spectrometer at the moment t respectively.

$$\begin{bmatrix} X_{L_{li}} \\ Y_{L_{li}} \\ Z_{L_{li}} \end{bmatrix} = \begin{bmatrix} X_{POS^{S1}} \\ Y_{POS^{S1}} \\ Z_{POS^{S1}} \end{bmatrix} + \begin{bmatrix} \Delta X_t^{S1} \\ \Delta Y_t^{S1} \\ \Delta Z_t^{S1} \end{bmatrix} \quad (5)$$

$$\begin{bmatrix} \phi_{L_{li}} \\ \omega_{L_{li}} \\ \kappa_{L_{li}} \end{bmatrix} = \begin{bmatrix} \phi_{POS^{S1}} \\ \omega_{POS^{S1}} \\ \kappa_{POS^{S1}} \end{bmatrix} + \begin{bmatrix} \Delta \varphi_t^{S1} \\ \Delta \omega_t^{S1} \\ \Delta \kappa_t^{S1} \end{bmatrix}$$

wherein ($X_{L_n}$, $Y_{L_n}$, $Z_{L_n}$),($\phi_{L_n}$, $\omega_{L_n}$, $\kappa_{L_n}$): represents high-precision POS information at the scan lines $L_n$($L_{\lambda i}$, $L_{12}$ ... $L_{1n}$) during the imaging time interval between S1 and S2 predicted according to the polynomial equation; and ($X_{POS^{S1}}$, $Y_{POS^{S1}}$, $Z_{POS^{S1}}$);($\phi_{POS^{S1}}$, $\omega_{POS^{S1}}$, $\kappa_{POS^{S1}}$) represents photography center position attitude information at S1 calculated with the photographs taken by the digital camera.

Likewise, the above calculations are repeated successively for S2, S3; S3, S4 and so on until Sn−1, Sn. In this way, linear array position attitude information of the imaging spectrometer for all the scan lines during the time interval from S1 to Sn is finally obtained. Using DEM data generated in combination with the obtained the high-precision array position attitude information, geometric precise correction of the imaging hyperspectrometer for the scan lines one by one can be implemented based on an imaging geometric collinearity equation, i.e. formula (6), to generate hyperspectral images:

$$\begin{bmatrix} X_P \\ Y_P \\ Z_P \end{bmatrix} = \begin{bmatrix} X_{L_{li}} \\ Y_{L_{li}} \\ Z_{L_{li}} \end{bmatrix} + \begin{bmatrix} a_1 & a_2 & a_3 \\ b_1 & b_2 & b_3 \\ c_1 & c_2 & c_3 \end{bmatrix} \begin{bmatrix} x \\ y \\ -f \end{bmatrix} \quad (6)$$

$$\begin{cases} a_1 = \cos\varphi_{L_{li}}\cos\kappa_{L_{li}} - \sin\varphi_{L_{li}}\sin\omega_{L_{li}}\sin\kappa_{L_{li}} \\ a_2 = \cos\varphi_{L_{li}}\sin\kappa_{L_{li}} - \sin\varphi_{L_{li}}\sin\omega_{L_{li}}\cos\kappa_{L_{li}} \\ a_3 = -\sin\varphi_{L_{li}}\cos\omega_{L_{li}} \\ b_1 = \cos\omega_{L_{li}}\sin\kappa_{L_{li}} \\ b_2 = \cos\omega_{L_{li}}\cos\kappa_{L_{li}} \\ b_3 = -\sin\omega_{L_{li}} \\ c_1 = \sin\varphi_{L_{li}}\cos\kappa_{L_{li}} + \cos\varphi_{L_{li}}\sin\omega_{L_{li}}\sin\kappa_{L_{li}} \\ c_2 = -\sin\varphi_{L_{li}}\sin\kappa_{L_{li}} + \cos\varphi_{L_{li}}\sin\omega_{L_{li}}\cos\kappa_{L_{li}} \\ c_3 = \cos\varphi_{L_{li}}\cos\omega_{L_{li}} \end{cases} \quad (7)$$

wherein (x, y) represents pixel coordinates on the imaging hyperspectral scan lines; ($X_p$, $Y_p$, $Z_P$) represents geometric coordinates after the geometric precise correction; and f is a focal length of the spectrometer.

Figure 3:
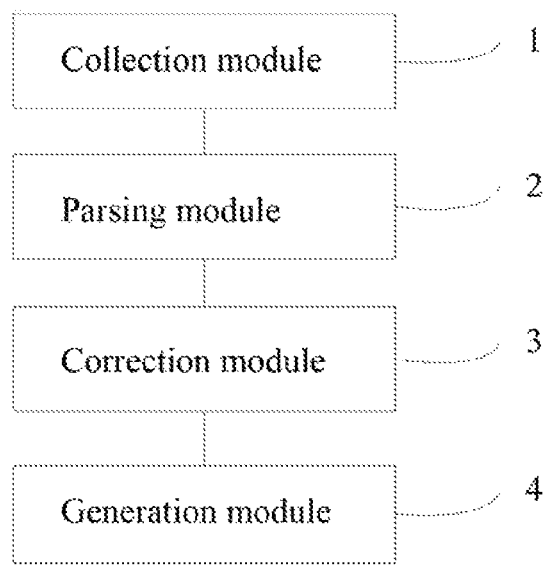
FIG. 3 is a modular diagram of a drone-mounted imaging hyperspectral geometric correction system in the present invention.

Embodiment II of the present invention further provides a drone-mounted imaging hyperspectral geometric correction system, as shown in FIG. 3, including a collection module 1, a parsing module 2, a correction module 3 and generation module 4;

the collection module 1 is used for collecting position attitude information of a current drone low-precision POS sensor in real time;

the parsing module 2 is used for based on the position attitude information collected by the acquisition module, parsing precise photography center position attitude information of a digital photograph, and based on the center position attitude information, generating a DEM of an area covered by the photograph; and the correction module 3 is used for based on the photography center position attitude information, performing correction on position attitude data corresponding to multiple imaging hyperspectral scan lines between photography centers of adjacent digital photographs, and obtaining linear array position attitude information of the multiple imaging hyperspectral scan lines; and the generation module 4 is used for based on the linear array position attitude information and the DEM, establishing a collinearity equation and generating a hyperspectral image.

Preferably, the system further includes a setting module; the selling module is used for arranging a digital camera, the imaging hyper-spectrometer and the drone low-precision POS sensor at adjacent positions in a same plane so that position attitude information of the three types of sensors is consistent; and the setting module is further used for setting a collecting frequency of the digital camera and setting a sampling frequency of the imaging hyper-spectrometer based on the collecting frequency of the digital camera.

Preferably, the correction module 3 includes a matching unit and a correction unit;

the matching unit is used for performing time matching between the position attitude information of the current drone low-precision POS sensor collected in real time and the multiple imaging hyperspectral scan lines between the photography centers of the adjacent digital photographs, and obtaining position attitude data corresponding to the imaging hyperspectral scan lines;

the correction unit is used for based on the precise photography center position attitude information, performing correction on the position attitude data corresponding to the imaging hyperspectral scan lines.

By adopting the drone-mounted imaging hyperspectral geometric correction method and system disclosed by the present invention, the high-precision POS information calculated from drone area array digital imaging data is used to perform optimization on the drone low-precision POS data, geometric precise correction of the imaging hyper-spectrometer for the scan lines one by one is implemented, thus providing technical support for drone imaging hyperspectral wide application.

Described above are merely embodiments of the present invention, which are not intended to limit the patent scope of the present invention, and all equivalent configuration or equivalent flow variations made based on the contents of the specification and the drawings or their direct or indirect application in other related technical fields are similarly encompassed within the patent protection scope of the present invention.

The invention claimed is:

1. A drone-mounted imaging hyperspectral geometric correction method, comprising:
   collecting position attitude information of a current drone low-precision position and orientation system (POS) sensor in real time;
   based on the position attitude information, parsing precise photography center position attitude information of a digital photograph, and generating a digital elevation model (DEM) of an area covered by the digital photograph;
   based on the precise photography center position attitude information, performing correction on position attitude data corresponding to multiple imaging hyperspectral scan lines between photography centers of adjacent digital photographs, and obtaining high-precision linear array position attitude information of the multiple imaging hyperspectral scan lines; and
   based on the high-precision linear array position attitude information and the DEM, establishing a collinearity equation and generating a hyperspectral image, thereby achieving drone-mounted imaging hyperspectral geometric correction.

2. The drone-mounted imaging hyperspectral geometric correction method of claim 1, further comprising, before collecting position attitude information of a current drone low-precision POS sensor in real time:
   arranging a digital camera, the imaging hyper-spectrometer, and the drone low-precision POS sensor at adjacent positions in a same plane so that position attitude information of the three types of sensors is consistent;
   setting a collecting frequency of the digital camera; and
   setting a sampling frequency of the imaging hyper-spectrometer based on the collecting frequency of the digital camera.

3. The drone-mounted imaging hyperspectral geometric correction method of claim 2, wherein setting the collecting frequency $V_{DC}$ of the digital camera is specifically:

setting the collecting frequency of the digital camera based on a drone flight height and flight speed and an observation field of view angle $FOV_{DC}$ of the digital camera;

$$V_{DC} = \frac{S}{2*H*tg(FOV_{DC}/2)*(1-r)}$$

wherein $V_{DC}$ represents the collecting frequency of the digital camera, S represents the drone flight speed, H represents the drone flight height, $FOV_{DC}$ represents the field of view angle of the digital camera, and r represents a photograph overlap degree required for space triangulation.

4. The drone-mounted imaging hyperspectral geometric correction method of claim 2, wherein the sampling frequency of the imaging hyper-spectrometer based on the collecting frequency of the digital camera is specifically:

$$V_{HIS} = \frac{S}{V_{DC}*2*H*tg(IFOV_{HIS}/2)}$$

wherein $V_{HIS}$ represents the sampling frequency of the imaging hyper-spectrometer, S represents the drone flight speed, H represents the drone flight height, and $IFOV_{HIS}$ represents a field of view angle corresponding to a single detector on an imaging spectrometer linear array.

5. The drone-mounted imaging hyperspectral geometric correction method of claim 1, wherein based on the position attitude information, parsing precise photography center position attitude information of the digital photograph includes:
based on the position attitude information of the current drone low-precision POS sensor collected in real time and the digital photograph, parsing the precise photography center position attitude information of the digital photograph using a space triangulation method.

6. The drone-mounted imaging hyperspectral geometric correction method of claim 1, wherein based on the precise photography center position attitude information,
performing correction on position attitude data corresponding to multiple imaging hyperspectral scan lines between photography centers of adjacent digital photographs includes:
performing time matching between the position attitude information of the current drone low-precision POS sensor collected in real time and multiple imaging hyperspectral scan lines between photography centers of adjacent digital photographs, and obtaining position attitude data corresponding to the imaging hyperspectral scan lines; and
based on the precise photography center position attitude information, performing correction on the position attitude data corresponding to the multiple imaging hyperspectral scan lines.

7. A drone-mounted imaging hyperspectral geometric correction system, comprising:
a collection module configured for collecting position attitude information of a current drone low-precision position and orientation system (POS) sensor in real time;
a parsing module configured for:
based on the position attitude information collected by an acquisition module, parsing precise photography center position attitude information of a digital photograph; and
based on the center position attitude information, generating a digital elevation model (DEM) of an area covered by the photograph;
a correction module configured for, based on the photography center position attitude information:
performing correction on position attitude data corresponding to multiple imaging hyperspectral scan lines between photography centers of adjacent digital photographs; and
obtaining linear array position attitude information of the multiple imaging hyperspectral scan lines; and
a generation module configured for, based on the linear array position attitude information and the DEM, establishing a collinearity equation and generating a hyperspectral image.

8. The system of claim 7, further comprising:
a setting module configured for arranging a digital camera; and
an imaging hyper-spectrometer;
wherein the setting module, the imaging hyper-spectrometer, and the drone low-precision POS sensor at adjacent positions in a same plane so that position attitude information of the three types of sensors is consistent; and
wherein the setting module is further configured for setting a collecting frequency of the digital camera and setting a sampling frequency of the imaging hyper-spectrometer based on the collecting frequency of the digital camera.

9. The system of claim 7, wherein the correction module includes:
a matching unit configured for performing time matching between the position attitude information of the current drone low-precision POS sensor collected in real time and the multiple imaging hyperspectral scan lines between the photography centers of the adjacent digital photographs, and obtaining position attitude data corresponding to the imaging hyperspectral scan lines; and
a correction unit configured for, based on the precise photography center position attitude information, performing correction on the position attitude data corresponding to the imaging hyperspectral scan lines.

* * * * *